Patented Jan. 2, 1940

2,185,951

UNITED STATES PATENT OFFICE 2,185,951

PROCESS FOR THE PRODUCTION OF POLYMERIZED UNSATURATED HYDROCARBONS

Fritz Rostler and Vilma Mehner, Vienna, Austria, assignors to Naftolen-Gesellschaft zur Verwertung der Rostler-Mehner 'schen Verfahren m. b. H., Vienna, Germany, a corporation of Austria, now Germany No Drawing. Application June 19, 1937, Serial No. 149,183. In Austria June 26, 1936

10 Claims. (Cl. 196—148)

This invention relates to the production of useful hydrocarbon compounds from organic constituents of the acid sludges occurring as waste products in the refining of mineral oil products.

The economical utilization of these waste products has for a long time formed the object of a great deal of experimental work. The practical attempts made to solve this problem, which have been primarily directed to recovering the organic constituents of acid sludge, led partly to the obtaining of asphalt-like substances, and partly, inasfar as they were concerned with recovering the oils still dispersed or distributed in the acid sludges, to mixtures from which, to judge by the statements made in the patent specifications concerned, substances were obtained having the same or similar properties as the refined products from which the original acid sludge was derived. It will be clear that such methods are inapplicable to acid sludges substantially free from suspended oil. The efforts made in the direction of utilizing the inorganic constituents of acid sludge led primarily to the production of sulphides and to the recovery of the sulphuric acid.

We have now found, as the result of extensive scientific research, that the viscous to solid, dark-colored waste products which are known as acid sludges consist for the greater part of linkage products of sulphuric acid on the existing organic constituents, these linkage products being formed in the refining process.

From these products we have succeeded in isolating a new group of highly polymerized, slightly unsaturated, more or less resinous hydrocarbons which are clearly distinguishable, in their chemical and physical properties, from the distillates from which the acid sludge is derived. These new hydrocarbons are particularly characterized by their solubility in ordinary concentrated sulphuric acid.

For the purpose of preparing these hydrocarbons we developed the method forming the subject of previous patent applications, Serial No. 751,891, filed November 7, 1934, and Serial No. 138,666, filed April 23, 1937. In this method, the acid sludge, in commixture with an excess of neutralizing agent, is subjected to dry distillation in vacuo, under conditions which impose the least possible strain on the material under treatment. Practical experience, however, has shown that the carrying out of this proposed method is attended with various drawbacks. It has been found, for instance, that during the neutralizing process local overheating occurs with consequent detrimental effect upon the yield; the vacuum distillation in the dry state necessitates very heavy heat consumption, since the poor conductivity of the solid charge, in conjunction with the insulating effect of the vacuum, which only admits of heat transmission at the points of contact with the pieces of the charge, necessitates the employment of very high temperatures. This greatly protracts the duration of the distilling process. A further reason for the high fuel consumption is to be found in the fact that the total quantity of neutralizing agent used has to be heated, as unnecessary ballast, up to the maximum working temperatures, and thus results in inefficient utilization of the distillation chamber.

All these drawbacks inherent in the previous method are obviated in our improved method forming the subject of the present application, by virtue of the fact that all the steps of the process are carried out in the liquid phase.

The essence of the invention thus resides in the fact that acid sludges are treated with a solution or suspension, advantageously in an aqueous medium, of the approximately equivalent quantity of neutralizing agent, preferably with heating. The resulting solution or sediment of inorganic salts is removed after stratification, and the resulting organic reaction product (if desired after pre-purification by extraction with suitable organic solvents such as for example acetone) is subjected to a distillation process, advantageously under a suitable vacuum. The entire process should be carried out in a vacuum such that distillation temperatures of up to 380° C. (at the conclusion of distillation) are not exceeded.

For the purpose of our new method any acid sludges may be used, irrespective of the manner in which they occur and of their origin; that is to say, irrespective of whether they are derived from paraffinic or naphthenic starting materials. Since it is the purpose of our method to obtain the above-mentioned viscous unsaturated hydrocarbons, it is advisable to use sludge acids which have been freed of sulphuric acid and above all of saturated mineral oils. We therefore use chiefly centrifuged acid sludges. In practising the method care must be taken to avoid doing anything capable of bringing about undesired polymerization of the unsaturated hydrocarbons to saturated, for which reason the sulphuric acid still contained in the sludge must be completely robbed of any effect it might be capable of having. It is thus advisable to first determine the quantity of neutralizing agent to be used, according to the sulphur content of the acid sludge calculated as 'SO₄'', whereby the whole of the free and combined sulphuric acid present is taken into account.

The following results are achieved by virtue of this improved working method:

(1) Thorough intermixing with the avoidance of any local heating of the products to be reacted;

(2) The inorganic reaction products, which are not required to take part in any distillation processes that may follow, can be readily and completely separated off;

(3) Nothing but a liquid product is subjected to distillation;

(4) The sulphuric acid contained in the acid sludges is economically made use of;

(5) More highly polymerized and more valuable products are obtained, than in the case of dry distillation.

Working in the liquid phase affords the possibility of managing with a smaller quantity of neutralizing agent, since in the heating of the mixture prior to distillation the neutralizing agent is exhaustively utilized, while with the previously practised dry distillation a great excess of neutralizing agent had to be employed to achieve the desired complete neutralization.

As a rule, in the present method the treatment of the acid sludges is carried out with the chemically equivalent quantity of neutralizing agent, determined as stated hereinabove. However, in some cases the nature of the oils originally refined is such that the acid sludges obtained therefrom have a tendency to form permanent emulsions or to saponify. Then, and in some other cases it is advisable for the purpose of minimizing the ash content of the hydrocarbon product and the residue of distillation, to work with somewhat less neutralizing agent than the calculated equivalent amount (see Example 5) or to employ successively, in one working process, weaker and stronger bases, for the purpose of effecting the neutralization (see Example 6), or to carry out or to finish the neutralization under pressure, that is to say at higher temperatures (Example 3).

In practising the method according to the present invention the preferred procedure is to introduce the acid sludge in batches into a hot aqueous solution or suspension of the calculated amount of the neutralizing agent, while stirring, and to complete the conversion reaction while boiling, after which the resulting organic reaction product, which is liquid at the elevated temperature, is separated from the sulphate solution formed. For the purpose of preliminarily purifying the resulting organic material it is useful, after termination of the neutralizing step, to wash out the inorganic salts with water or aqueous salt solutions, and then to dry the residue and subject the same to distillation, after removal of the residual inorganic salts separating out in the drying stage. Or, alternatively, the same purpose can be served by extracting the organic material with suitable organic solvents, for example acetone, and subjecting the extract to careful distillation under the conditions specified above.

With this method of working the residue of distillation is kept down to a minimum. When organic solvents are used instead of water for dissolving or suspending the neutralizing agent, it is merely necessary to effect decantation from the inorganic sediment (sulphates) formed.

The careful distillation to be employed in isolating the products according to the invention preferably consists in vacuum distillation under relatively high vacuum and at correspondingly low temperature. A vacuum under 120 mm. Hg is preferably used, in which case the temperatures reached at the end of the distillation are, at the most, of the order of 380° C. Under practical working conditions a temperature of 320° C., at a vacuum of 40 mm. Hg, is not usually exceeded. Vacuum steam distillation may be employed in place of vacuum distillation, the sum of the partial pressures ensuring maintenance of the temperature within the limit given. With this method of working there are obtained more highly polymerized products than with the prior method of dry distillation.

The quantity of the solvent, preferably water, to be used in preparing the solution or suspension of the neutralizing agent, must be so determined that the resulting dispersion of inorganic matter (sulfates) differs considerably in specific gravity from the organic reaction product obtained.

In practicing the method of the present invention, the sulphuric acid contained in the starting sludge is recovered in the form of salts which constitute a secondary product of the method, fit for use either immediately after crystallizing out or, if desired, after purification. The highly polymerized hydrocarbons obtained as the primary product of the method may be applied to a variety of uses, for instance in the rubber and varnish industries. The employment of these products in the rubber industry is of particularly great economic interest, since the hydrocarbons obtained in accordance with this invention represent a valuable filler which can be incorporated in rubber in large quantities, thus enabling a large proportion of the rubber content of the mixture to be replaced. Even when large proportions of these hydrocarbons are used as fillers, the vulcanized products obtained have physical properties which are not inferior to those of vulcanized products made from pure rubber mixtures.

Various applications of our new hydrocarbons in the rubber industry are described in more detail and claimed in our copending applications, Serial Nos. 57,322 and 166,392.

As neutralizing agents there may be employed metals, their oxides, hydroxides, and if desired salts, more particularly compounds of the alkalies and alkaline earths, it being also possible to add suitable catalytically acting substances, either singly or in mixtures. Salts suitable for use as neutralizing agents in our process are carbonates, including the chalk, dolomite, and magnesite disclosed in our aforesaid applications; and suitable catalysts are heavy metal salts, including iron compounds, as also disclosed in our aforesaid applications.

The following examples are intended, without being exhaustive, to be illustrative of the practising of the method according to the present invention on a technical or industrial scale.

Examples (1) Into 100 parts of water, which is heated to boiling, there is introduced 20 parts of burned magnesite, followed by 100 parts of de-oiled acid sludge from lubricating oil refining, such as is obtained by centrifuging with De Laval separators. This sludge is added in batches. After conclusion of the conversion the magnesium sulphate solution formed is run off; the saponified acid sludge, after having been heated to 155° C., is separated from the sediment, and then distilled in a vacuum of 20 mm. Hg. The yield is is approximately 60 parts of a red-brown, strongly fluorescent, viscous, resin-like product which is almost completely soluble in concentrated sulphuric acid with vigorous heat development and the formation of a product similar to acid sludge. The composition of the distillation products, after purification, is shown, by analysis, to be C=90%, H=10%.

(2). 100 parts by weight of a non-centrifuged acid sludge from spindle oil refining is introduced into 200 parts by weight of water. After separation of the layers: spindle oil (dilute aqueous sulphuric acid) acid resin, the latter (80 parts by weight) is introduced into a hot solution of 16 parts by weight of sodium hydroxide in 80 parts by weight of water; the mixture is boiled for an hour, washed with water, dilute sulphuric acid, and again with water, dried, and thus made ready for vacuum distillation. The liquid reaction product thus obtained leaves no appreciable residue after vacuum distillation. When distillation is carried out over copper oxide in a vacuum of 6 mm. Hg the yield amounts to 40% of the acid sludge used. The properties of the product obtained are the same as those of the product in the case of Example 1.

(3) 100 parts of acid resin derived from lubricating oil refining is mixed with 30 parts of calcium oxide and 100 parts of water, heated to boiling, and after conclusion of the reaction, heated for 2 hours at 6 atm. in an autoclave in the presence of 0.5 part of FeSO₄; after removal of the aqueous layer, the organic reaction product is diluted with benzine (gasoline), and the reaction residue, after getting rid of the solvent, subjected to vacuum distillation. The yield amounts to 55% of the acid sludge used.

(4) 100 parts of acid resin obtained in the centrifugal refining of lubricating oil is dissolved in 100 parts of acetone oil, and the solution commixed with 30 parts of pulverized lime. The heat of reaction thereby liberated renders all further supply of heat unnecessary. After decanting from the sediment, and distilling off the solvent, the residue is subjected to vacuum steam distillation, the yield amounting to 50% of the acid resin used as starting material.

(5) 100 parts of acid sludge derived from cylinder oil refining, having a total sulphur content of 8.5%, is introduced, in batches, into a boiling suspension of 8 parts of burned magnesite in 80 parts of water, with stirring; after the reaction has ended the mixture is left to stand for 3 hours, the magnesium sulphate solution run off, and the organic, weakly acid reaction product, after dehydration by slow heating to 200° C., is dried and distilled in vacuo. The quantity of magnesite to be used is calculated from the acid number of the acid sludge used $$\left(KOH : \frac{MgO}{2} :: \text{acid number} : x\right)$$

The alkalinity of the burned magnesite to be used is determined volumetrically by titration with $$\frac{n}{2}H_2SO_4$$

(6) 100 parts of acid sludge of the same type as in the preceding example is mixed with a suspension prepared by introducing 8 parts by weight of magnesium oxide into 80 parts of water kept at boiling, after which the mixture is boiled, and neutralization completed in the heat with a concentrated solution of 4.1 parts by weight of solid sodium hydroxide; after the lye has been run off, the resulting neutral reaction product is dried by heating to 150° C. in vacuo, and subjected to distillation under the conditions specified above. The resulting product has the same properties as the products obtained in the previous examples.

The quantities of neutralizing agent theoretically required in any particular case are ascertained by analytical determination of the total sulphur content of the acid sludge used. The quantities and proportions given in the examples relate to parts by weight. In the foregoing examples, the acid sludges used were in all cases obtained from uncracked distillates, of which lubricating oil is generally the most desirable source of acid sludges for our purpose.

We claim:

1. A process for the production of polymerized unsaturated hydrocarbons soluble in sulfuric acid and adapted for inclusion in large quantities in rubber mixtures and vulcanizable therewith, which comprises mixing acid sludge obtained in the sulfuric acid refining of mineral oil distillates, and substantially free from suspended and emulsified neutral oils, with an alkaline inorganic neutralizing agent selected from the group consisting of oxides, hydroxides and carbonates of alkali and alkali earth metals, said agent being employed in a quantity sufficient to combine with sulfuric acid present in the sludge in free and combined form, and mixing therewith sufficient liquid to maintain the mixture in a liquid state, the admixed liquid being adapted to facilitate heat transfer to and reaction of the sludge and neutralizing agent and separation of the resulting reaction products, agitating the mixture and heating it to cause reaction between the said neutralizing agent and said sulfuric acid of the sludge and thereby forming an inorganic reaction product containing said sulfuric acid and also forming a substantially acid-free organic reaction product containing said polymerized unsaturated hydrocarbons, separating the organic reaction product from said inorganic reaction product and said liquid, and recovering said unsaturated hydrocarbons from the separated organic reaction product, the said unsaturated hydrocarbons having boiling points between 150° C. and 380° C., and the temperatures employed throughout the process being maintained in the range below about 380° C.

2. The process of claim 1, wherein the said acid sludge is obtained by refining lubricating oil.

3. The process of claim 1, wherein the said liquid employed to maintain the mixture liquid is water.

4. The process of claim 1, wherein the said liquid employed to maintain the mixture liquid is an organic solvent for said hydrocarbons.

5. The process of claim 1, wherein the said neutralizing agent is dispersed in a quantity of water sufficient to maintain the desired liquid state of the mixture, and wherein the acid sludge is added to the dispersion during agitation and heating thereof.

6. The process of claim 1, wherein the unsaturated hydrocarbons recovered from the organic reaction product have substantially the composition 90 per cent carbon, 10 per cent hydrogen.

7. The process of claim 1, wherein the said acid sludge is heated with the said neutralizing agent and water to cause the said reaction, and wherein the organic reaction product is separated from the water and inorganic reaction product, washed, dried, and distilled under vacuum to recover the said unsaturated hydrocarbons.

8. The process of claim 1, wherein the said acid sludge is heated with the said neutralizing agent and water to cause the said reaction, and wherein an organic solvent for said unsaturated hydrocarbons is added to the reaction mixture and the resulting organic solution is separated from the inorganic reaction product and from water and is distilled to recover said organic solvent and said unsaturated hydrocarbons.

9. The process of claim 1, wherein the said agitation and heating of the mixture to cause reaction between the neutralizing agent and the sulphuric acid of the sludge take place under pressure higher than atmospheric.

10. A process for the production of unsaturated hydrocarbons soluble in sulfuric acid and vulcanizable with rubber, which comprises mixing together acid sludge obtained in the sulfuric acid refining of mineral oil distillates, and an alkali reacting inorganic neutralizing agent and a sufficient quantity of water to maintain the mixture in a liquid state throughout the process, said neutralizing agent being selected from the group consisting of oxides, hydroxides and carbonates of metals forming stable sulfates and being employed in a quantity sufficient to combine with all the sulfur in the sludge, calculated as $SO_3$, agitating the mixture and heating it to cause reaction between the neutralizing agent and sulfur compounds in the sludge, and thereby forming an inorganic reaction product consisting principally of sulfate and also forming an organic reaction product substantially free from sulfur and containing said polymerized unsaturated hydrocarbons, separating the organic reaction product from said inorganic reaction product and water, and recovering said unsaturated hydrocarbons from the organic reaction product by distillation, the temperatures employed throughout the process being maintained in the range below about 380° C.

FRITZ ROSTLER.
VILMA MEHNER.